US00RE43627E

(19) United States
(12) Reissued Patent
Kim et al.

(10) Patent Number: US RE43,627 E
(45) Date of Reissued Patent: Sep. 4, 2012

(54) APPARATUS AND METHOD FOR MULTIPLEXING PACKETS FOR BROADCAST SERVICES IN A MOBILE COMMUNICATION SYSTEM BASED ON ORTHOGONAL FREQUENCY DIVISION MULTIPLEXING

(75) Inventors: Dong-Hee Kim, Yongin-si (KR); Youn-Sun Kim, Seongnam-si (KR); Jung-Soo Jung, Seoul (KR); Dae-Gyun Kim, Seongnam-si (KR); Jin-Weon Chang, Suwon-si (KR); Min-Kyeong Kim, legal representative, Seoul (KR); Beom-Sik Bae, Suwon-si (KR); Jin-Kyu Han, Suwon-si (KR); Hwan-Joon Kwon, Suwon-si (KR)

(73) Assignee: Samsung Electronics Co., Ltd (KR)

(21) Appl. No.: 13/113,689

(22) Filed: May 23, 2011

Related U.S. Patent Documents

Reissue of:
(64) Patent No.: 7,577,127
Issued: Aug. 18, 2009
Appl. No.: 11/143,593
Filed: Jun. 3, 2005

(30) Foreign Application Priority Data

Jun. 3, 2004 (KR) ..... 10-2004-0040406

(51) Int. Cl.
*H04J 1/00* (2006.01)

(52) U.S. Cl. ..... 370/343; 370/203; 370/319

(58) Field of Classification Search ..... 370/203, 370/295, 310, 319, 343, 344, 430
See application file for complete search history.

(56) References Cited

U.S. PATENT DOCUMENTS

| | | | | |
|---|---|---|---|---|
| 7,221,680 | B2 * | 5/2007 | Vijayan et al. | 370/441 |
| 2004/0008614 | A1 * | 1/2004 | Matsuoka et al. | 370/203 |
| 2004/0208253 | A1 * | 10/2004 | Joo | 375/260 |
| 2005/0058089 | A1 * | 3/2005 | Vijayan et al. | 370/312 |
| 2005/0063298 | A1 * | 3/2005 | Ling et al. | 370/208 |
| 2005/0122928 | A1 * | 6/2005 | Vijayan et al. | 370/312 |
| 2005/0276254 | A1 * | 12/2005 | Zhang | 370/343 |
| 2006/0018269 | A1 * | 1/2006 | Agrawal et al. | 370/321 |

FOREIGN PATENT DOCUMENTS

| | | |
|---|---|---|
| KR | 1020010048949 | 6/2001 |
| KR | 1020020094883 | 12/2002 |

* cited by examiner

*Primary Examiner* — Quochien B Vuong
(74) *Attorney, Agent, or Firm* — The Farrell Law Firm, P.C.

(57) ABSTRACT

An apparatus and method for multiplexing packets for broadcast services in a mobile communication system based on orthogonal frequency division multiplexing (OFDM). The OFDM system has a transmission structure in which one slot includes at least two symbols, and each symbol includes a plurality of subcarriers. Different broadcast service packets received from at least two channels are multiplexed into one slot and a result of the multiplexing is transmitted. Overhead information of the channel packets multiplexed into the one slot is generated and transmitted.

36 Claims, 11 Drawing Sheets

| | |
|---|---|
| [...] | |
| LogicalChannelSameAsPrevious BCMCSFlow | 1 |

Zero or one occurrence of the following four fields

| | |
|---|---|
| PhysicalChannelCount | 7 |
| DataRate | 0 or 4 |
| OuterCode | 0 or 4 |
| MACPacketsPerECBRow | 0 or 4 |

Zero or PhysicalChannelCount occurrences of the following two fields:

| | |
|---|---|
| Interlace | 2 |
| Multiplex | 4 |
| [...] | |

FIG.3

| | |
|---|---|
| [...] | |
| LogicalChannelSameAsPrevious BCMCSFlow | 1 |

Zero or one occurrence of the following four fields

| | |
|---|---|
| PhysicalChannelCount | 10 |
| DataRate | 0 or 4 |
| OuterCode | 0 or 4 |
| MACPacketsPerECBRow | 0 or 4 |

Zero or PhysicalChannelCount occurrences of the following five fields:

| | |
|---|---|
| Interlace | 2 |
| Multiplex | 4 |
| UseWholeSlot | 1 |
| Symbol | 0 or 2 |
| Subcarrier | 0 or 1 |
| [...] | |

FIG.7

APPARATUS AND METHOD FOR MULTIPLEXING PACKETS FOR BROADCAST SERVICES IN A MOBILE COMMUNICATION SYSTEM BASED ON ORTHOGONAL FREQUENCY DIVISION MULTIPLEXING

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the benefit under 35 U.S.C. §119(a) of Korean Patent Application No. 10-2004-0040406 entitled "Apparatus And Method For Multiplexing Packets For Broadcast Services In A Mobile Communication System Based On Orthogonal Frequency Division Multiplexing" filed in the Korean Intellectual Property Office on Jun. 3, 2004, the entire disclosure of which is incorporated herein by reference.

BACKGROUND OF THE INVENTION

1. Field of the Invention

The present invention relates generally to a mobile communication system and method for supporting multimedia services. More particularly, the present invention relates to a system and method for efficiently providing forward broadcast services.

2. Description of the Related Art

A conventional cellular mobile communication system, for example, a mobile communication system based on Code Division Multiple Access 2000 (CDMA2000) High Rate Packet Data (HRPD), supports a unicast service for providing a specific terminal with CDMA data. An address of the specific terminal is designated such that data can be transmitted and received. An access network assigns a frequency band for transmitting data to a corresponding user. However, when the same service data is provided to multiple users, a unicast scheme wastes resources in a network and wireless zone, and increases system load.

FIG. 1 illustrates an example of an Error Control Block (ECB) for providing a broadcasting service in a conventional CDMA system.

Referring to FIG. 1, one ECB includes 16 rows. Each row includes a 125-octet Media Access Control (MAC) packet transmitted from a higher layer. The ECB as illustrated in FIG. 1, is transmitted from a base station to a mobile terminal through a logical channel. In this case, multiple logical channels may be used. Conventionally, one logical channel may be regarded as one broadcast program.

One row of the ECB is 125 octets (that is, 8*125, resulting in 1,000 bits). Moreover, because one row additionally includes 24 overhead bits for transmitting a physical layer packet, 1,024 bits are transmitted as one physical layer packet.

FIG. 2 illustrates a structure for transmitting an ECB as illustrated in FIG. 1. Referring to FIG. 2, one of the columns along the horizontal axis denotes a time slot of high-speed packet data. A physical layer packet is divided and transmitted into two time slots. One time slot is 1.67 ms.

Accordingly, it can be assumed that a logical channel transmits a physical layer packet in two slots at a transmission rate of 307.2 kbps, such that the information of 1,024 bits can be sent.

In FIG. 2, I denotes an interlace index, and interlace indices 0, 1, 2, and 3 are repeated in a time slot unit. One interlace is divided into four multiplexes. In FIG. 2, M denotes a multiplex index.

A transmission structure as shown in FIG. 2 must be set in advance between a base station and a mobile terminal. The transmission structure is determined by mapping tables as shown in Tables 1 and 2.

Table 1 below shows an example of an interlace-multiplex pair mapping table associated with a logical channel.

TABLE 1

| | Multiplex | | | |
|---|---|---|---|---|
| Interlace | 0 | 1 | 2 | 3 |
| 0 | 0 | 0 | 0 | 0 |
| 1 | 0 | — | — | — |
| 2 | — | — | — | — |
| 3 | — | — | — | — |

As shown in Table 1, a mapping value 0 is assigned to interlace-multiplex pairs (0, 0), (0, 1), (0, 2), (0, 3), and (1, 0). This indicates that Logical Channel 0 is transmitted in the interlace-multiplex pairs. It can be assumed that the other logical channels are transmitted in remaining combinations.

In FIG. 2, it can be found that packets of the ECB are transmitted in time slots based on the interlace-multiplex pairs (0, 0), (0, 1), (0, 2), (0, 3), and (1, 0). A time slot of the interlace-multiplex pair (0, 0) is used twice, such that one packet can be transmitted. A time slot of the interlace-multiplex pair (1, 0) is used four times, such that two packets can be transmitted.

Table 2 below shows length information of an interlace-multiplex pair.

TABLE 2

| | Multiplex | | | |
|---|---|---|---|---|
| Interlace | 0 | 1 | 2 | 3 |
| 0 | 2 | 2 | 2 | 2 |
| 1 | 4 | 1 | 1 | 1 |
| 2 | 1 | 1 | 1 | 1 |
| 3 | 1 | 1 | 1 | 1 |

Referring to Table 2, the burst length of the interlace-multiplex pairs (0, 0), (0, 1), (0, 2), and (0, 3) is 2, and the burst length of the interlace-multiplex pair (1, 0) is 4. Because the length of one physical layer packet is 2, one physical layer packet is transmitted in the interlace-multiplex pairs (0, 0), (0, 1), (0, 2), or (0, 3). Two physical layer packets are transmitted in the interlace-multiplex pairs (1, 0). For convenience, it can be assumed that the burst length of the other logical channels is 1.

The base station uses Tables 1 and 2, and sets a transmission interval as illustrated in FIG. 2. Through the transmission interval, packets of the ECB as illustrated in FIG. 1, are multiplexed and sequentially transmitted.

FIG. 3 partially illustrates the format of a conventional broadcast overhead message associated with a logical channel for transmitting a specific Broadcast-Multicast Service (BCMCS) flow. A message field of FIG. 3 may be repeated according to each BCMCS flow identifier (ID).

Referring to FIG. 3, a LogicalChannelSameAsPrevious-BCMCSFlow field contains information indicating if a current logical channel on which a current BCMCS flow ID is transmitted, is the same as a previous logical channel on which a previous BCMCS flow ID is transmitted. If the two channels are the same, the LogicalChannelSameAsPrevious-BCMCSFlow field is set to 1. Further, since the configuration of the current logical channel is the same as that of the previous logical channel, when the LogicalChannelSameAsPreviousBCMCSFlow field is set to 1, the other fields are omitted. When the configuration of the current logical channel is different from that of the previous logical channel, the LogicalChannelSameAsPreviousBCMCSFlow field is set to 0.

In this case, a PhysicalChannelCount field is set to a value corresponding to the number of interlace-multiplex pairs occupying the logical channel. Each interlace-multiplex pair is indicated by an Interlace field and a Multiplex field. A DataRate field indicates a transmission rate of broadcast data to be transmitted through the logical channel. An OuterCode field indicates an outer coding scheme. A MACPacket-PerECBRow field indicates the number of higher layer packets included in one row.

If 99% of the users located within a sector can receive the broadcast service at 307.2 kbps when the conventional CDMA communication system provides a broadcast service, one physical layer packet can be transmitted in two slots. For example, when a time period for transmitting a physical layer packet is doubled, a diversity gain is obtained but a data rate is reduced to half. An HRPD system for transmitting only one packet in one time slot wastes resources by a reduced transmission rate.

When Orthogonal Frequency Division Multiplexing (OFDM) is applied to the HRPD system such that a transmission rate of a broadcast service can increase, 99% of the users located within the sector can receive the broadcast service at 1.2 Mbps. In this case, because a physical layer packet is transmitted in one time slot, there is a problem in that a diversity gain cannot be obtained.

Accordingly, a need exists for an improved system and method capable of simultaneously providing the same broadcasting service to a plurality of users while conserving resources.

SUMMARY OF THE INVENTION

Accordingly, the present invention has been designed to solve the above and other problems occurring in the prior art. Therefore, it is an aspect of the present invention to provide a multiplexing apparatus and method for providing broadcast services in a High Rate Packet Data (HRPD) system based on Orthogonal Frequency Division Multiplexing (OFDM).

It is another aspect of the present invention to provide a multiplexing apparatus and method that can obtain a diversity gain by multiplexing a plurality of logical channels into one time slot.

The above and other aspects of the present invention can be substantially achieved by a method for providing broadcast services in an Orthogonal Frequency Division Multiplexing (OFDM) system with a transmission structure in which one slot includes at least two symbols and wherein each symbol includes a plurality of subcarriers. The method comprises the steps of multiplexing into one slot different broadcast service packets received from at least two channels, and transmitting a result of the multiplexing, and generating and transmitting overhead information of the channel packets multiplexed into the one slot.

Preferably, the multiplexing step may comprise the step of assigning packets of different channels to each symbol included in the one slot.

Preferably, the packets of the different channels assigned to each symbol may be assigned to at least two grouped subcarriers.

Preferably, groups of the subcarriers may comprise odd and even subcarriers.

Preferably, the overhead information may comprise information indicating multiplexing on different broadcast service packets, mapping information about symbol positions of the multiplexed channel packets when the different broadcast service packets are multiplexed, and mapping information about subcarrier groups of the multiplexed channel packets when the different broadcast service packets are multiplexed.

The above and other aspects of the present invention can also be substantially achieved by an apparatus for providing broadcast services in a base station of an Orthogonal Frequency Division Multiplexing (OFDM) system with a transmission structure in which one slot includes at least two symbols and each symbol includes a plurality of subcarriers. The apparatus comprises a multiplexer for multiplexing into one slot different broadcast service packets received from at least two channels, and transmitting a result of the multiplexing, and a transmitter for generating and transmitting overhead information of the channel packets multiplexed into the one slot.

Preferably, the multiplexer may comprise a symbol multiplexer for assigning packets of different channels to each symbol included in the one slot, and a subcarrier multiplexer for assigning to two grouped subcarriers, the channel packets assigned to each symbol.

BRIEF DESCRIPTION OF THE DRAWINGS

The above and other aspects and advantages of the present invention will become more clearly understood from the following detailed description taken in conjunction with the accompanying drawings, in which:

FIG. 3 illustrates the format of a conventional broadcast overhead message for the broadcast service;

FIG. 7 illustrates the format of a broadcast overhead message for supporting a transmission structure in accordance with an embodiment of the present invention.

Throughout the drawings, like reference numerals will be understood to refer to like parts, components and structures.

DETAILED DESCRIPTION OF THE EXEMPLARY EMBODIMENTS

Figure 1:
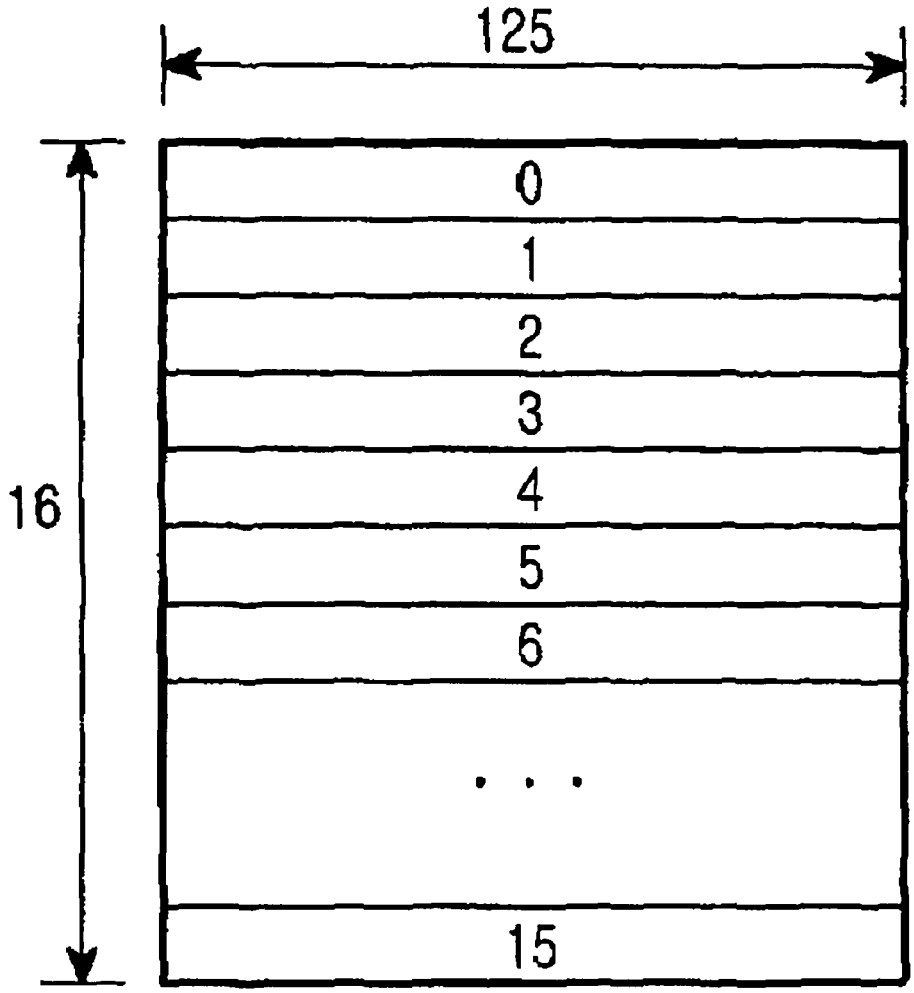
FIG. 1 illustrates a structure of an error control block.
Figure 2:
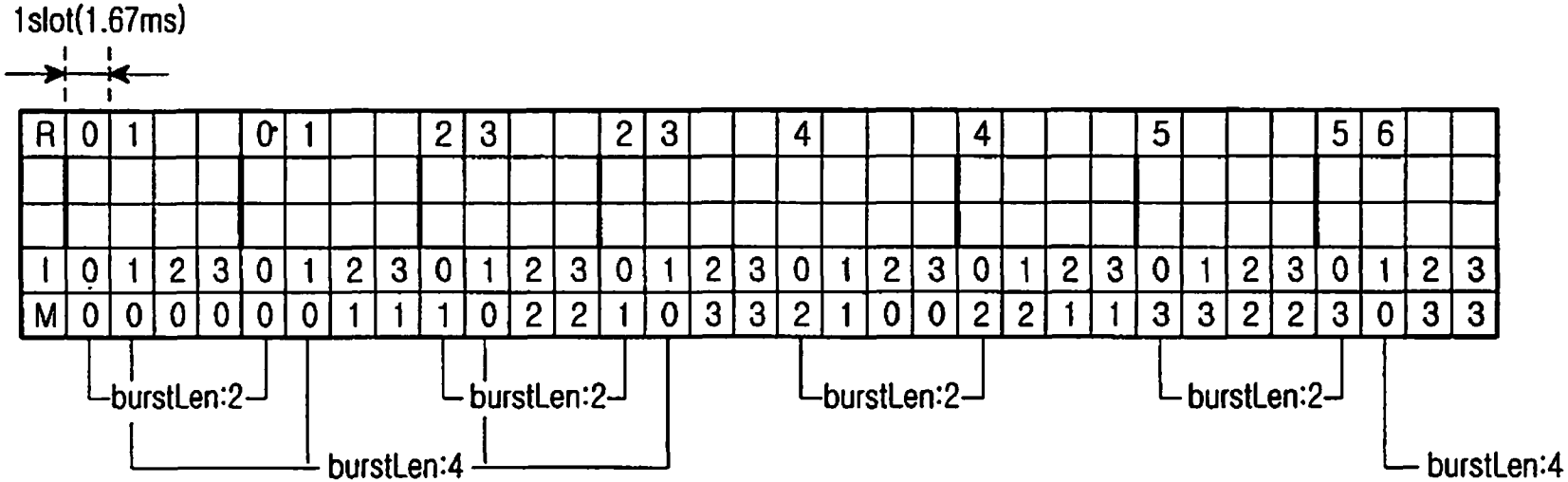
FIG. 2 illustrates a conventional structure for transmitting an error control block for a broadcast service.

A number of exemplary embodiments of the present invention will be described in detail herein below with reference to the accompanying drawings. In the drawings, same or similar elements are denoted by the same reference numerals even though they are depicted in different drawings. In the following description, detailed descriptions of functions and configurations incorporated herein that are well known to those skilled in the art will be omitted for clarity and conciseness.

The present invention proposes a multiplexing method and apparatus, and a method for configuring a physical layer packet such that a diversity gain can be obtained and frequency efficiency can be maximized when a High Rate Packet Data (HRPD) system multiplexes a plurality of logical channels to provide broadcast services using Orthogonal Frequency Division Multiplexing (OFDM). Accordingly, the present invention sets a minimum unit for packet transmission to an OFDM symbol/subcarrier rather than a time slot, reduces the amount of information to be inserted in the minimum unit, and increases the length of a physical layer packet.

Figure 4A:
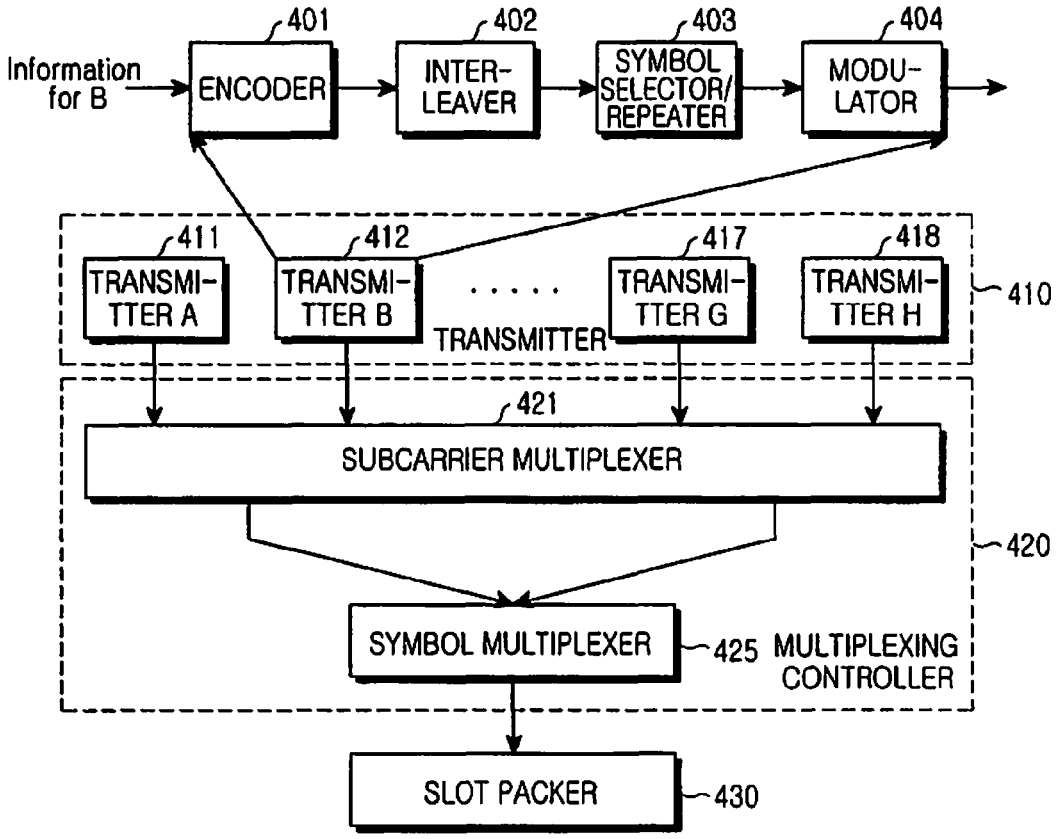
FIG. 4A is a block diagram illustrating a transmission apparatus for multiplexing Orthogonal Frequency Division Multiplexing (OFDM) symbols/subcarriers in a base station of an OFDM system in accordance with an embodiment of the present invention.

FIG. 4A is a block diagram illustrating an apparatus for transmitting packet data in a base station of an OFDM-based mobile communication system in accordance with an embodiment of the present invention.

Referring to FIG. 4A, a transmitter 410 performs channel coding and modulation to transmit physical layer packets for a plurality of logical channels. The transmitter 410 includes Transmitter A 411 to Transmitter H 418, corresponding to the logical channels.

The top portion of FIG. 4A illustrates the details of Transmitter B 412 for transmitting a physical layer packet for a logical channel. Transmitter B 412 conventionally comprises an encoder 401, an interleaver 402, a symbol selector/repeater 403, and a modulator 404, that are well known to those skilled in the art. Packets processed by the transmitters 411, 412, 417, 418, and the like, are multiplexed through a multiplexing controller 420. A slot packer 430 packs packets output from the multiplexing controller 420 in each time slot, and transmits the packed packets through a physical channel.

Figure 4B:
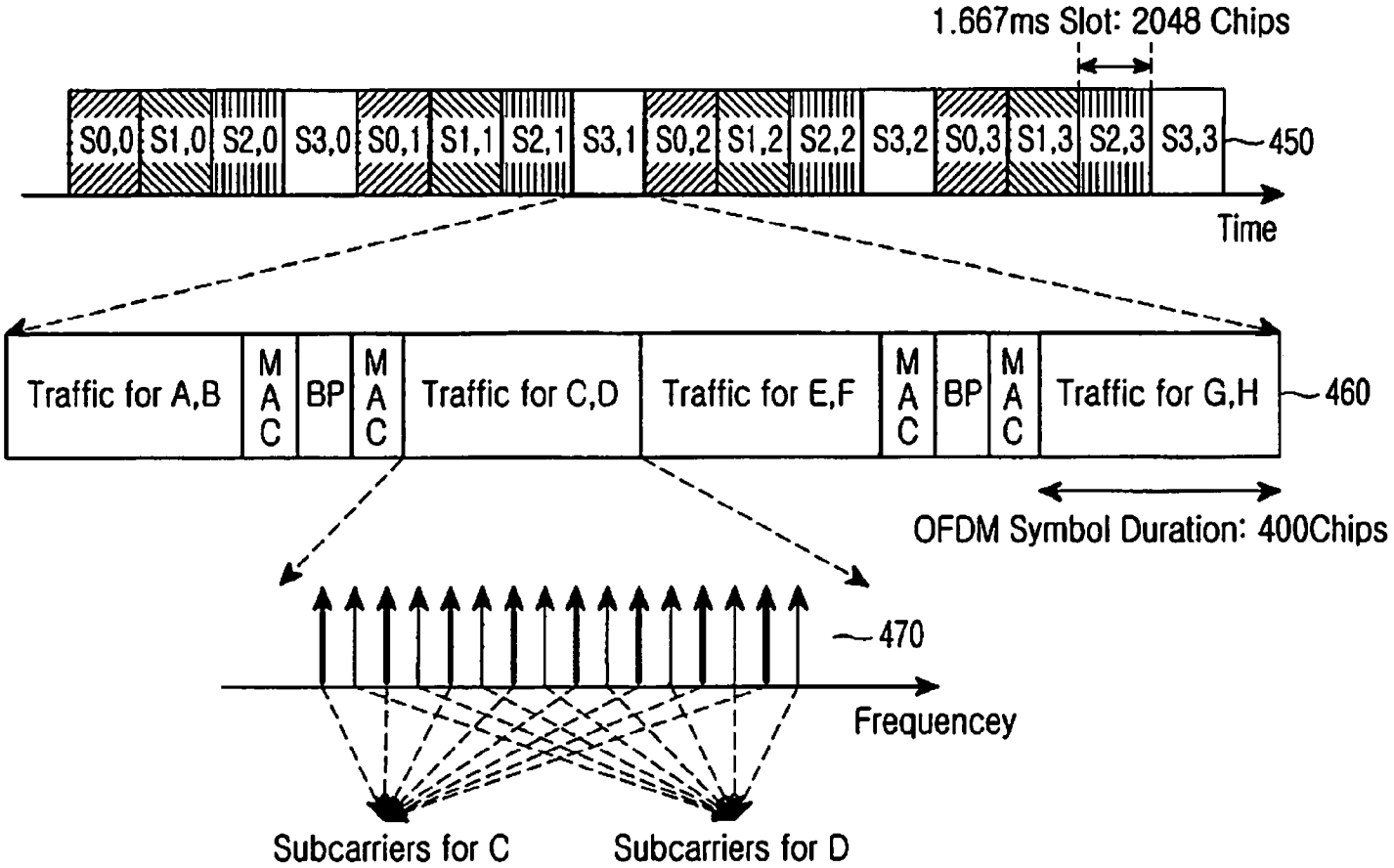
FIG. 4B illustrates a slot output from the transmission apparatus of FIG. 4A in accordance with an embodiment of the present invention.

In FIG. 4B, reference numeral 450 denotes a transmission slot structure, and reference numeral 460 denotes one slot.

Four symbols are transmitted in one time slot. One symbol has the length of 400 samples. A Burst Pilot (BP) of FIG. 4B is the same as that of a conventional HRPD system. A Media Access Control (MAC) field includes power control information and control channel information for an Acknowledgement/Negative Acknowledgement (ACK/NAK) reply to a Hybrid Automatic Repeat Request (H-ARQ).

In the frequency domain, each OFDM symbol comprises Nsub number of orthogonal subcarriers. Arrows indicated by reference numeral 470 represent subcarriers of the second OFDM symbol within the time slot.

In conventional applications, a physical layer packet is multiplexed in one or two slots. In this case, a minimum unit for packet transmission is a slot. However, in FIG. 4B, it can be found that the minimum unit is a symbol or subcarrier.

In FIG. 4B, (S0, 0), (S1, 0), and the like, represent a transmission slot, respectively. Physical Layer Packets A to H are multiplexed into a transmission slot (S3, 1). Packets A and B are multiplexed in the first OFDM symbol, Packets C and D are multiplexed in the second OFDM symbol, Packets E and F are multiplexed in the third OFDM symbol, and Packets G and H are multiplexed in the fourth OFDM symbol. Packets C and D of the second OFDM symbol are multiplexed in the subcarrier domain. Packet C is multiplexed in an odd subcarrier domain, and Packet D is multiplexed in an even subcarrier domain.

The multiplexing controller 420 of FIG. 4A comprises a subcarrier multiplexer 421 for multiplexing the different Physical Layer Packets A to H in the subcarrier domain, and a symbol multiplexer 425 for multiplexing the packets, multiplexed by the subcarrier multiplexer 421 in the symbol domain. The number of output signals of the subcarrier multiplexer 421 may be one or more. For example, when transmission data is grouped and subcarriers are multiplexed on a group-by-group basis, a plurality of signals after subcarrier multiplexing may be output from the subcarrier multiplexer 421.

A single subcarrier multiplexer 421 is illustrated in FIG. 4A. Alternatively, multiple subcarrier multiplexers may be provided. That is, a subcarrier multiplexer connected to Transmitters A and B, and a subcarrier multiplexer connected to Transmitters C and D, may transmit multiplexed data to the symbol multiplexer 425. Then, the symbol multiplexer 425 can multiplex received data in a symbol unit.

In FIG. 4A, multiplexing is performed in both the OFDM symbol domain and the subcarrier domain. Alternatively, multiplexing may be performed in either the symbol domain or the subcarrier domain according to an operating mode.

The present invention propose at least three exemplary embodiments of a multiplexing method for providing broadcast services in a transmission apparatus of a base station based on OFDM.

A first embodiment provides a method for multiplexing and transmitting logical channels in the symbol domain to provide the broadcast services.

A second embodiment provides a method for multiplexing and transmitting logical channels in the subcarrier domain to provide the broadcast services.

The first embodiment for multiplexing and transmitting logical channels in the symbol domain will now be described in greater detail.

When, for example, a logical channel for providing a broadcast service is output from Transmitter A 411 in FIG. 4A, a packet can be output from Transmitter A 411 to bypass the subcarrier multiplexer 421 and is output to the symbol multiplexer 425. A method for multiplexing only packets output from the transmitter 411 for a broadcast service in the symbol multiplexer 425 for such an example will now be described in greater detail in accordance with an embodiment of the present invention. The symbol multiplexer 425 can receive and multiplex packets output from other transmitters. In the first embodiment, an Error Control Block (ECB) to be transmitted is illustrated in FIG. 1.

Figure 5A:
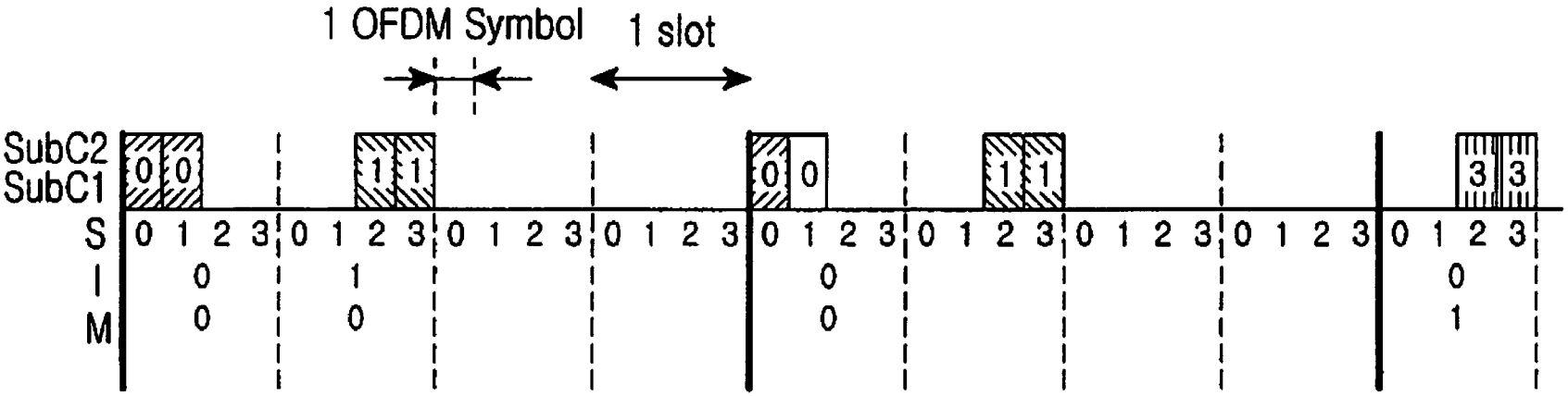
FIG. 5A illustrates a transmission structure based on multiplexing in the OFDM symbol domain in accordance with a first embodiment of the present invention.

FIG. 5A illustrates a transmission structure based on multiplexing in the OFDM symbol domain in accordance with the first embodiment of the present invention. It can be assumed that the burst length is set to one time slot before multiplexing is applied in the OFDM symbol domain. In FIG. 5A, S denotes an OFDM symbol index. Four OFDM symbols are present in one slot. Packet 0 uses all OFDM symbols within one slot in the conventional applications. However, only two OFDM symbols can be used within one slot in the first embodiment of the present invention. In this case, the burst length of Packet 0 of FIG. 1 is increased to 2. Also in FIG. 5A, I denotes an interlace index, and M denotes a multiplex index.

The operation of the symbol multiplexer for performing multiplexing in the symbol domain as illustrated in FIG. 5A will now be described in greater detail with reference to FIG. 5B.

Figure 5B:
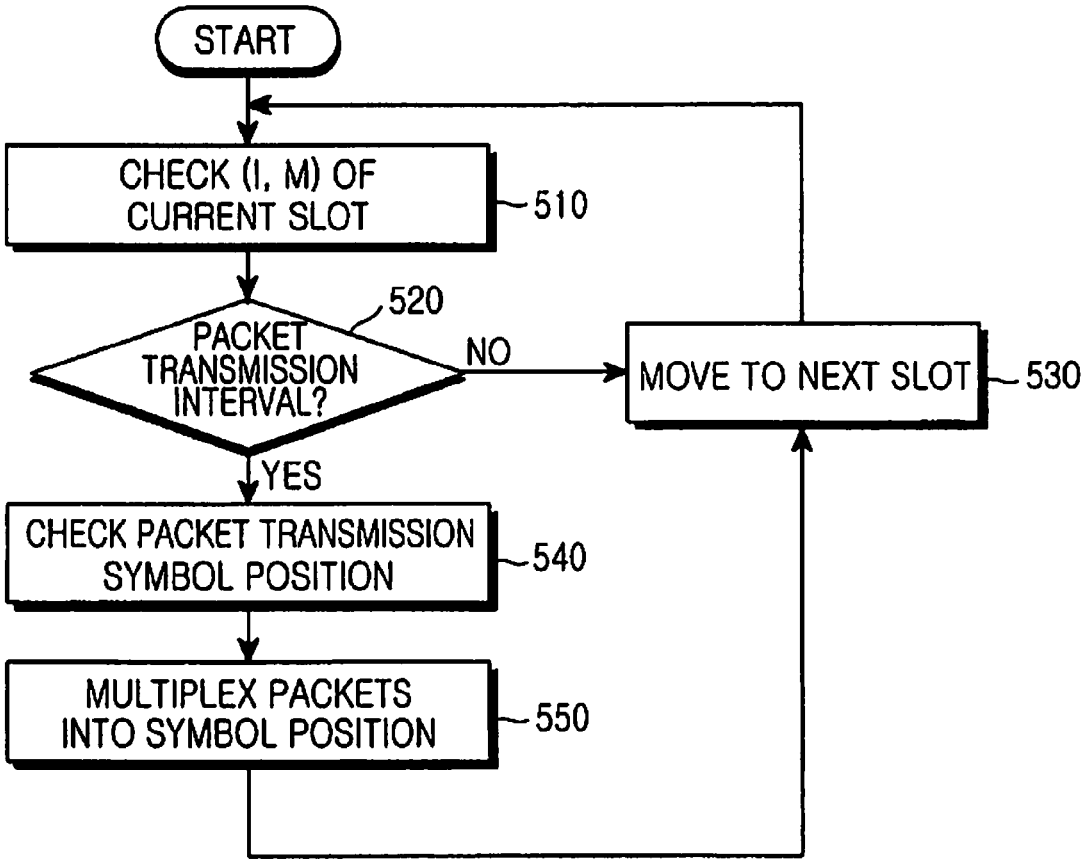
FIG. 5B is a flow chart illustrating the operation of a symbol multiplexer in accordance with the first embodiment of the present invention.

Referring to the method of FIG. 5B, the symbol multiplexer checks a (I,M) pair mapped to a current time slot in step 510. A (I,M) pair mapped to each slot is defined by Tables 1 and 2 as used in the conventional applications. The symbol multiplexer refers to Table 1 and determines if the current slot mapped to a (I, M) pair is a packet transmission interval in step 520.

If the current slot is not a packet transmission interval in step 520, the symbol multiplexer moves to the next slot for multiplexing in step 530, and repeats step 510. However, if the current slot is a packet transmission interval in step 520, the symbol multiplexer detects a position of a packet transmission symbol in step 540. The symbol multiplexer determines whether to set the packet transmission interval to two front or rear symbols within one slot. The symbol multiplexer uses Table 3 below for OFDM symbol mapping associated with interlace-multiplex pairs.

TABLE 3

| | Multiplex | | | |
|---|---|---|---|---|
| Interlace | 0 | 1 | 2 | 3 |
| 0 | 0 | 1 | — | — |
| 1 | 1 | — | — | — |
| 2 | — | — | — | — |
| 3 | — | — | — | — |

In Table 3, a value 0 mapped to (0, 0) indicates that the two front symbols of the four OFDM symbols are used, and a value 1 mapped to (0, 1) and (1, 0) indicates that the two rear symbols of the four OFDM symbols are used. If a packet occupies one of the four OFDM symbols, the burst length can be increased to 4. In Table 3, the OFDM symbol mapping is expressed using mapping values 0, 1, 2, and 3.

The symbol multiplexer multiplexes packets into the symbol position in step 550. Referring again to FIG. 5A, because a mapping value in Table 3 is 0 when (I, M) is (0, 0), the two front symbols are used for multiplexing.

The second embodiment for multiplexing and transmitting logical channels in the subcarrier domain will now be described in greater detail.

When, for example, a logical channel for a broadcast service is output from Transmitter A 411, the subcarrier multiplexer 421 can multiplex a packet output from Transmitter A 411 and the packet multiplexed by the subcarrier multiplexer 421 can bypass the symbol multiplexer 425.

Figure 6A:
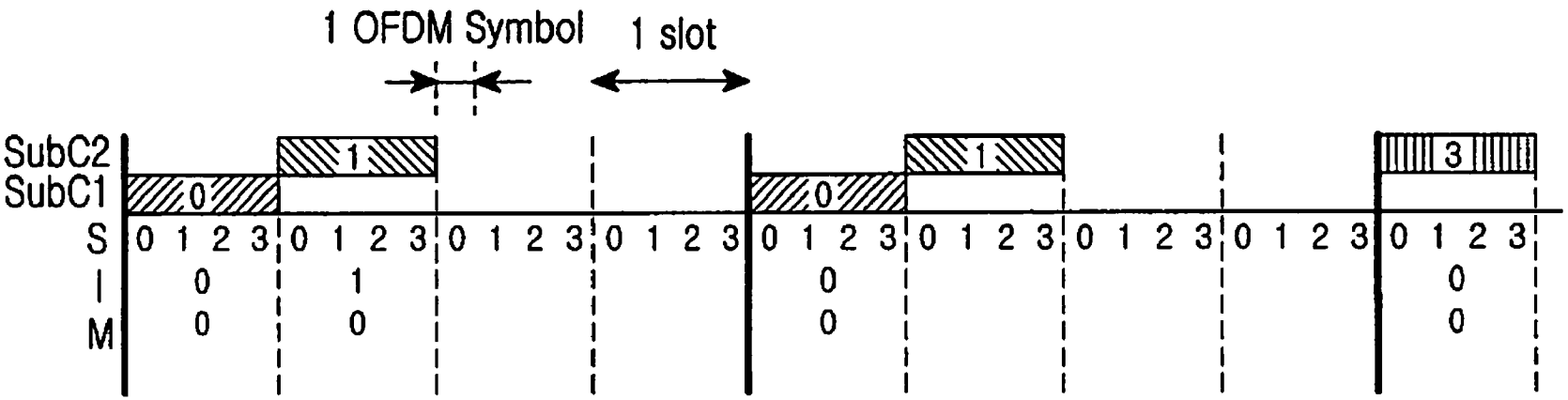
FIG. 6A illustrates a transmission structure based on multiplexing in the subcarrier domain in accordance with a second embodiment of the present invention.

FIG. 6A illustrates a transmission structure based on multiplexing in the subcarrier domain in accordance with the second embodiment of the present invention. In the second embodiment, it can be assumed that the burst length is set to one time slot before multiplexing is applied in the subcarrier domain. SubC1 and SubC2 denote two subcarrier groups. The subcarrier groups may be separated into odd and even subcarriers, or higher and lower subcarriers. In the former case, subcarriers are uniformly distributed in a frequency band. In the latter case, because subcarriers are biased to one side of a frequency band, subcarrier group assignment must be changed when the second half part of a packet is transmitted.

When SubC1 and SubC2 are separated into odd and even subcarriers, SubC1 may be used even when the second half part of Packet 0 is transmitted as illustrated in FIG. 6A.

The operation of the subcarrier multiplexer for performing multiplexing in the subcarrier domain as illustrated in FIG. 6A will be described with reference to FIG. 6B.

Figure 6B:
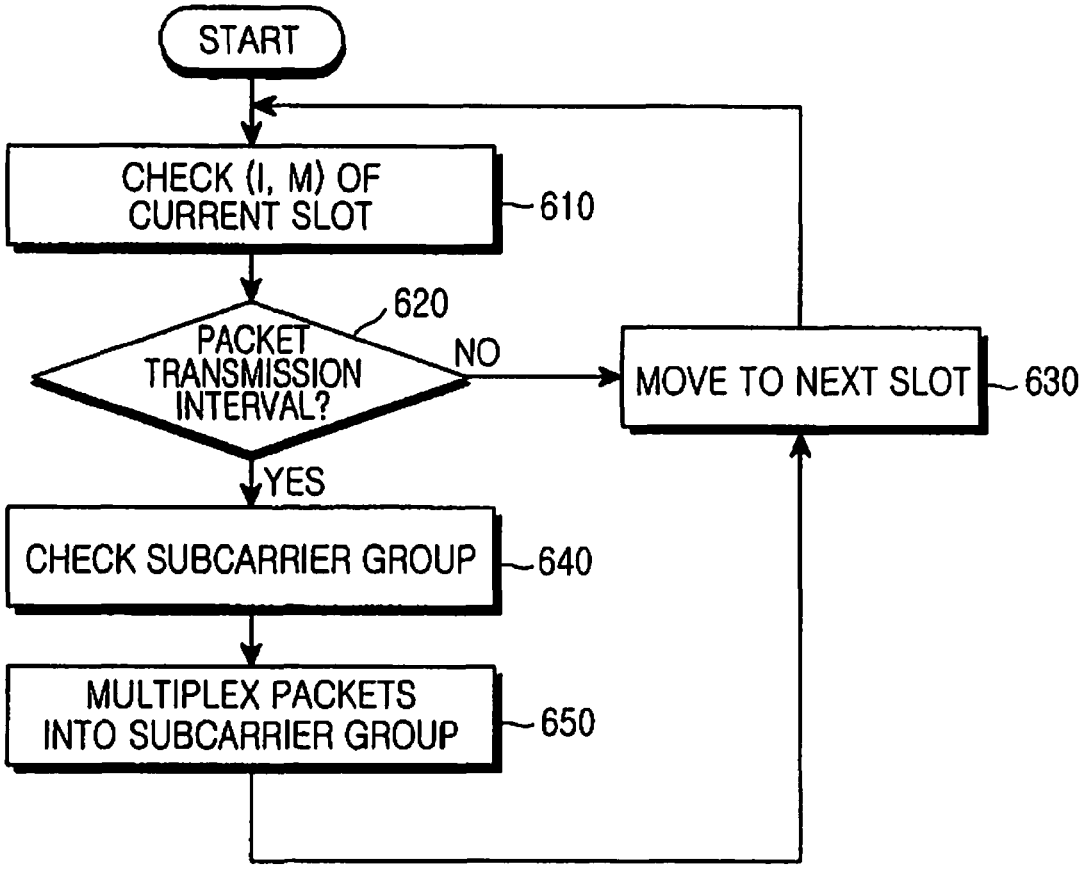
FIG. 6B is a flow chart illustrating the operation of a subcarrier multiplexer in accordance with the second embodiment of the present invention.

Referring to the method of FIG. 6B, the subcarrier multiplexer checks a (I,M) pair mapped to a current time slot in step 610. A (I,M) pair mapped to each slot is defined by Tables 1 and 2 as used in the conventional applications. The subcarrier multiplexer refers to Table 1, and determines if the current slot mapped to a (I,M) pair is a packet transmission interval in step 620.

If the current slot is not a packet transmission interval in step 620, the subcarrier multiplexer moves to the next slot for multiplexing in step 630 and repeats step 610. However, if the current slot is a packet transmission interval in step 620, the subcarrier multiplexer detects a packet transmission subcarrier group in step 640. In step 640, the subcarrier multiplexer determines if the packet transmission interval is an odd subcarrier group SubC1, or an even subcarrier group SubC2. In this case, the subcarrier multiplexer uses Table 4 below for subcarrier mapping associated with interlace-multiplex pairs.

TABLE 4

| | Multiplex | | | |
|---|---|---|---|---|
| Interlace | 0 | 1 | 2 | 3 |
| 0 | 0 | 1 | — | — |
| 1 | 1 | — | — | — |
| 2 | — | — | — | — |
| 3 | — | — | — | — |

In Table 4, a value 0 mapped to (0, 0) indicates that the odd subcarrier group SubC1 is used, and a value 1 mapped to (0, 1) and (1, 0) indicates that the even subcarrier group SubC2 is used.

Because the number of subcarrier groups is 2, the burst length is set to 2. If the number of subcarrier groups is larger than 2, the burst length can be increased to more than 2. In Table 4, the subcarrier mapping is expressed using mapping values 0, 1, 2, and 3.

The subcarrier multiplexer multiplexes packets into the determined subcarrier group in step 650. Referring again to FIG. 6A, because a mapping value in Table 4 is 0 when (I, M) is (0, 0), multiplexing is performed for the odd subcarrier group SubC1.

Figure 6C:
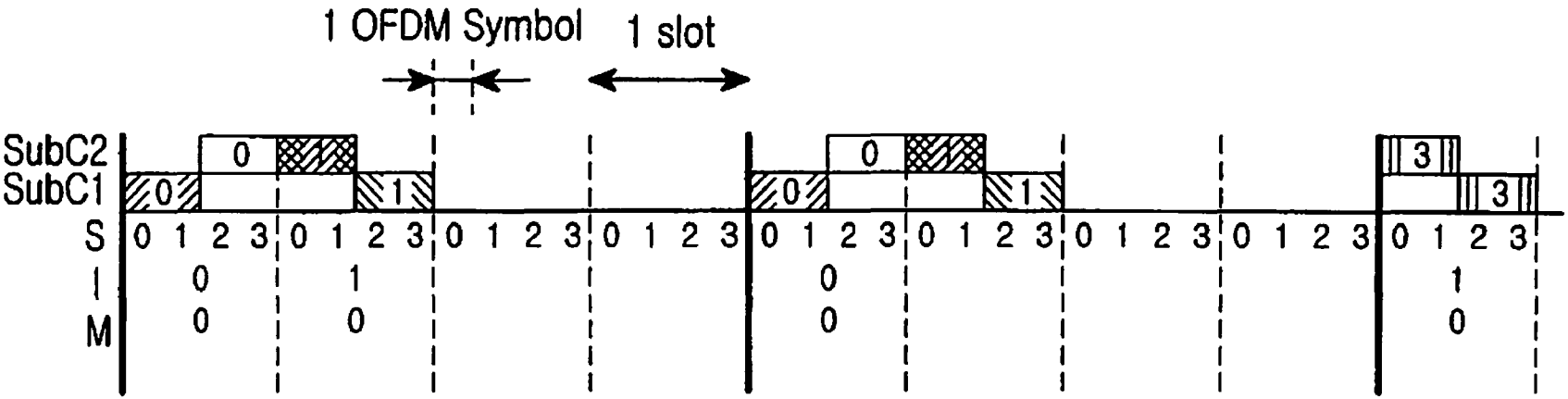
FIG. 6C illustrates a transmission structure in the subcarrier domain in accordance with another embodiment of the present invention.

FIG. 6C illustrates a transmission structure in the subcarrier domain in accordance with another, or third embodiment of the present invention.

The exemplary embodiment of FIG. 6C performs almost the same operation as that illustrated in the method of FIG. 6B. In the exemplary embodiment of FIG. 6C, a value 0 mapped to (0, 0) representing (Interlace, Multiplex) in Table 4 used in step 640, indicates that the odd subcarrier group SubC1 is used in an interval of Symbols 0 and 1 and that the even subcarrier group SubC2 is used in an interval of Symbols 2 and 3. A value 1 mapped to (0, 1) and (1, 0), indicates that the even subcarrier group SubC2 is used in an interval of Symbols 0 and 1 and the odd subcarrier group SubC1 is used in an interval of Symbols 2 and 3. A case where four OFDM symbols are present in one slot has been described. Alternatively, a number N of OFDM symbols may be present in one slot according to extension, wherein N is an integer greater than 4.

In this case, the base station must correct the format of a broadcast overhead message to notify the mobile terminal of a transmission structure of the embodiment of the present invention.

FIG. 7 illustrates the format of a broadcast overhead message for supporting a transmission structure in accordance with an embodiment of the present invention.

In FIG. 7, the broadcast overhead message is used to indicate a logical channel containing a Broadcast-Multicast Service (BCMCS) flow ID when four symbols are transmitted in each transmission slot and two subcarriers are used in each symbol interval. When the number of symbols or subcarriers in each slot is different, field lengths can be different.

When the broadcast overhead message of FIG. 7 is used, a broadcast logical channel can be designated by (Interlace, Multiplex, Symbol, Subcarrier) through Interlace, Multiplex, Symbol, and Subcarrier fields.

Because a minimum unit of the broadcast logical channel is determined by a (Interlace, Multiplex, Symbol, Subcarrier) set, the length of a PhysicalChannelCount field designating the number of (Interlace, Multiplex, Symbol, Subcarrier) sets is increased.

Accordingly, the length of the message of FIG. 7 for designating symbol and subcarrier positions is longer than that of the conventional message of FIG. 3. Also, a time period required for transmitting the message of FIG. 7 increases. To reduce a message transmission time, all symbols and subcarriers of a specific Interlace/Multiplex can be assigned for respective BCMCS flow IDs. In this case, a UseWholeSlot field is set to 1, and the Symbol and Subcarrier fields can be omitted.

The present invention reduces the amount of data to be inserted in a minimum unit for data transmission and increases the length of a physical layer packet, thereby obtaining a diversity gain and maximizing frequency efficiency.

Although a number of exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for providing broadcast services in an Orthogonal Frequency Division Multiplexing (OFDM) system with a transmission structure in which one slot includes at least two symbols and each symbol includes a plurality of subcarriers, comprising the steps of:

multiplexing packets of different broadcast service into one slot, and transmitting the multiplexed packets; and transmitting overhead information related to the multiplexed packets, wherein the overhead information includes indicating information about whether the packets of the different broadcast service are multiplexed, first mapping information about symbol positions of the multiplexed packets when the packets of the different broadcast service are multiplexed, and second mapping information about subcarrier groups of the multiplexed packets when the packets of the different broadcast service are multiplexed.

2. The method of claim 1, wherein the multiplexing step comprises the step of:

assigning packets of one broadcast service to some symbols within the one slot, and assigning packets of another broadcast service to remaining symbols.

3. The method of claim 2, wherein the one slot comprises four symbols, and the packets of the one broadcast service are assigned in a unit of two symbols.

4. The method of claim 1, wherein the multiplexing step comprises the step of:

assigning the packets of the different broadcast service to each symbol comprised in the one slot.

5. The method of claim 4, wherein the packets of the different broadcast service assigned to each symbol are assigned to at least two grouped subcarriers.

6. The method of claim 5, wherein groups of the subcarriers comprise odd and even subcarriers.

7. An apparatus for providing broadcast services in a base station of an Orthogonal Frequency Division Multiplexing (OFDM) system with a transmission structure in which one slot includes at least two symbols and each symbol includes a plurality of subcarriers, comprising:

a multiplexer for multiplexing-packets of different broadcast service into one slot, and transmitting the multiplexed packets; and a transmitter for transmitting overhead information related to the multiplexed packets, wherein the overhead information includes indicating information about whether the packets of the different broadcast service are multiplexed, first mapping information about symbol positions of the multiplexed packets when the packets of the different broadcast service are multiplexed, and second mapping information about subcarrier groups of the multiplexed packets when the packets of the different broadcast service are multiplexed.

8. The apparatus of claim 7, wherein the multiplexer comprises:

a symbol multiplexer for assigning packets of one broadcast service to some symbols within the one slot, and assigning packets of another broadcast service to remaining symbols; and a subcarrier multiplexer for assigning to two grouped subcarriers the packets of the one broadcast service assigned to the symbols.

9. The apparatus of claim 7, wherein the multiplexer comprises:

a symbol multiplexer for assigning the packets of different broadcast service to each symbol included in the one slot; and a subcarrier multiplexer for assigning to two grouped subcarriers the different broadcast service packets assigned to each symbol.

10. The apparatus of claim 9, wherein the symbol multiplexer assigns the broadcast service packets in a unit of two symbols, wherein the one slot comprises four symbols.

11. The apparatus of claim 10, wherein the subcarrier multiplexer classifies the subcarriers into odd and even subcarrier groups.

12. A method for configuring a broadcast overhead message based on a multiplexing method in an Orthogonal Frequency Division Multiplexing (OFDM) system with a transmission structure in which one slot includes at least two symbols and each symbol includes a plurality of subcarriers, comprising the steps of:

configuring indicating information about whether different broadcast service packets are multiplexed or not;

configuring first mapping information about symbol positions of the multiplexed packets when the different broadcast service packets are multiplexed; and configuring second mapping information about subcarrier groups of the multiplexed packets when the different broadcast service packets are multiplexed.

*13. A method for providing broadcast services in an Orthogonal Frequency Division Multiplexing (OFDM) system with a transmission structure in which a transmission unit is defined by at least two minimum units, the at least two minimum units comprising a symbol and a subcarrier, the method comprising the steps of:*

*multiplexing packets of different broadcast services into the transmission unit to be transmitted as multiplexed packets; and*

*transmitting overhead information related to the multiplexed packets,*

*wherein the overhead information includes information about whether the packets of the different broadcast services are multiplexed, and mapping information about the multiplexed packets according to the at least two minimum units.*

*14. The method of claim 13, wherein the multiplexing step comprises:*

*assigning packets of one broadcast service to some symbols within the transmission unit, and assigning packets of another broadcast service to remaining symbols.*

*15. The method of claim 14, wherein the transmission unit comprises four symbols, and the packets of the one broadcast service are assigned in a unit of two symbols.*

*16. The method of claim 13, wherein the multiplexing step comprises:*

*assigning the packets of the different broadcast services to each symbol in the transmission unit.*

*17. The method of claim 16, wherein the packets of the different broadcast services assigned to each symbol are assigned to at least two grouped subcarriers.*

*18. The method of claim 17, wherein groups of the subcarriers comprise odd and even subcarriers.*

*19. An apparatus for providing broadcast services in a base station of an Orthogonal Frequency Division Multiplexing (OFDM) system with a transmission structure in which a transmission unit is defined by at least two minimum units, the at least two minimum units comprising a symbol and a subcarrier, the apparatus comprising:*

*a multiplexer for multiplexing packets of different broadcast services into the transmission unit to be transmitted as multiplexed packets; and*

*a transmitter for transmitting overhead information related to the multiplexed packets,*

*wherein the overhead information includes information about whether the packets of the different broadcast services are multiplexed, and mapping information about the multiplexed packets according to the at least two minimum units.*

*20. The apparatus of claim 19, wherein the multiplexer comprises:*

*a symbol multiplexer for assigning packets of one broadcast service to some symbols within the transmission unit, and assigning packets of another broadcast service to remaining symbols; and*

*a subcarrier multiplexer for assigning to two grouped subcarriers the packets of the one broadcast service assigned to the symbols.*

*21. The apparatus of claim 19, wherein the multiplexer comprises:*

*a symbol multiplexer for assigning the packets of different broadcast services to each symbol included in the transmission unit; and*

*a subcarrier multiplexer for assigning to two grouped subcarriers the different broadcast service packets assigned to each symbol.*

*22. The apparatus of claim 21, wherein the symbol multiplexer assigns the broadcast service packets in unit of two symbols, wherein the transmission unit comprises four symbols.*

*23. The apparatus of claim 22, wherein the subcarrier multiplexer classifies the subcarriers into odd and even subcarrier groups.*

*24. A method for configuring a broadcast overhead message based on a multiplexing method in an Orthogonal Frequency Division Multiplexing (OFDM) system with a transmission structure in which a transmission unit is defined by at least two minimum units, the at least two minimum units comprising a symbol and a subcarrier, the method comprising the steps of:*

*configuring information about whether different broadcast service packets are multiplexed or not; and*

*configuring mapping information about the multiplexed packets according to the at least two minimum units.*

*25. A data structure of a broadcast overhead message in an Orthogonal Frequency Division Multiplexing (OFDM) system with a transmission structure in which a transmission unit is defined by at least two minimum units, the at least two minimum units comprising a symbol and a subcarrier, the data structure embodied on a processor-readable medium, comprising:*

*a first portion containing information about whether different broadcast service packets are multiplexed or not; and*

*a second portion containing mapping information about the multiplexed packets according to the at least two minimum units.*

*26. A method for providing broadcast services in an Orthogonal Frequency Division Multiplexing (OFDM) system with a transmission structure in which one slot includes at least two symbols and each symbol includes a plurality of subcarriers, the method comprising the steps of:*

*multiplexing packets of different broadcast services into one slot, and transmitting the multiplexed packets; and*

*transmitting overhead information related to the multiplexed packets,*

*wherein the overhead information includes indicating information about whether the packets of the different broadcast services are multiplexed, and mapping information about both symbol positions and subcarriers of the multiplexed packets when the packets of the different broadcast services are multiplexed.*

*27. The method of claim 26, wherein the multiplexing step comprises:*

*assigning packets of one broadcast service to some symbols within the one slot, and assigning packets of another broadcast service to remaining symbols.*

*28. The method of claim 27, wherein the one slot comprises four symbols, and the packets of the one broadcast service are assigned in a unit of two symbols.*

*29. The method of claim 26, wherein the multiplexing step comprises:*

*assigning the packets of the different broadcast services to each symbol in the one slot.*

*30. The method of claim 29, wherein the packets of the different broadcast services assigned to each symbol are assigned to at least two grouped subcarriers.*

*31. The method of claim 30, wherein groups of the subcarriers comprise odd and even subcarriers.*

*32. An apparatus for providing broadcast services in a base station of an Orthogonal Frequency Division Multiplexing (OFDM) system with a transmission structure in which one slot includes at least two symbols and each symbol includes a plurality of subcarriers, comprising:*

*a multiplexer for multiplexing packets of different broadcast services into one slot, and transmitting the multiplexed packets; and*

*a transmitter for transmitting overhead information related to the multiplexed packets,*

*wherein the overhead information includes indicating information about whether the packets of the different broadcast services are multiplexed, and mapping information about both symbol positions and subcarriers of the multiplexed packets when the packets of the different broadcast services are multiplexed.*

*33. The apparatus of claim 32, wherein the multiplexer comprises:*

*a symbol multiplexer for assigning packets of one broadcast service to some symbols within the one slot, and assigning packets of another broadcast service to remaining symbols; and*

*a subcarrier multiplexer for assigning to two grouped subcarriers the packets of the one broadcast service assigned to the symbols.*

*34. The apparatus of claim 32, wherein the multiplexer comprises:*

*a symbol multiplexer for assigning the packets of different broadcast services to each symbol included in the one slot; and*

*a subcarrier multiplexer for assigning to two grouped subcarriers the different broadcast services packets assigned to each symbol.*

*35. The apparatus of claim 34, wherein the symbol multiplexer assigns the broadcast service packets in a unit of two symbols, wherein the one slot comprises four symbols.*

*36. The apparatus of claim 35, wherein the subcarrier multiplexer classifies the subcarriers into odd and even subcarrier groups.*

* * * * *